(12) United States Patent
Nakakuki et al.

(10) Patent No.: US 11,845,499 B2
(45) Date of Patent: Dec. 19, 2023

(54) CONTROL DEVICE FOR POWER STEERING DEVICE

(71) Applicant: HITACHI AUTOMOTIVE SYSTEMS, LTD., Hitachinaka (JP)

(72) Inventors: Yasuhito Nakakuki, Atsugi (JP); Kazuya Yamano, Yamato (JP); Atsushi Ishikawa, Kawasaki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 723 days.

(21) Appl. No.: 16/967,474

(22) PCT Filed: Jan. 31, 2019

(86) PCT No.: PCT/JP2019/003347
§ 371 (c)(1),
(2) Date: Aug. 5, 2020

(87) PCT Pub. No.: WO2019/181224
PCT Pub. Date: Sep. 26, 2019

(65) Prior Publication Data
US 2021/0206424 A1  Jul. 8, 2021

(30) Foreign Application Priority Data
Mar. 20, 2018 (JP) .................. 2018-052079

(51) Int. Cl.
*B62D 5/04* (2006.01)
*B62D 15/02* (2006.01)

(52) U.S. Cl.
CPC ......... *B62D 5/0463* (2013.01); *B62D 5/0421* (2013.01); *B62D 5/0481* (2013.01);
(Continued)

(58) Field of Classification Search
CPC .. B62D 5/0463; B62D 5/0421; B62D 5/0481; B62D 15/0215; B62D 5/0469; B62D 5/0472
See application file for complete search history.

(56) References Cited

U.S. PATENT DOCUMENTS

| 5,504,403 A | 4/1996 | McLaughlin |
| 2015/0019082 A1* | 1/2015 | Inoue ................... B62D 15/025 701/41 |

(Continued)

FOREIGN PATENT DOCUMENTS

| JP | 2838053 B2 | 12/1998 |
| JP | 2001-106048 A | 4/2001 |

(Continued)

OTHER PUBLICATIONS

International Search Report issued in corresponding application No. PCT/JP2019/003347 dated Mar. 26, 2019 with English translation.
(Continued)

*Primary Examiner* — Behrang Badii
*Assistant Examiner* — Jay Khandpur
(74) *Attorney, Agent, or Firm* — FOLEY & LARDNER LLP

(57) ABSTRACT

A control device for a power steering device includes a low-pass filter unit including a cutoff frequency adjustment unit configured to adjust a cutoff frequency for partially attenuating a component of an input signal, set the cutoff frequency to a first cutoff frequency when a steering torque signal is lower than a first predetermined torque value, and to set the cutoff frequency to a second cutoff frequency lower than the first cutoff frequency when the steering torque signal is equal to or higher than the first predetermined torque value.

10 Claims, 10 Drawing Sheets

(52) U.S. Cl.
CPC ........ *B62D 15/0215* (2013.01); *B62D 5/0469* (2013.01); *B62D 5/0472* (2013.01)

(56) References Cited

U.S. PATENT DOCUMENTS

| | | | | |
|---|---|---|---|---|
| 2015/0066306 A1* | 3/2015 | Kodera | ................ | B62D 5/049 701/43 |
| 2016/0304119 A1* | 10/2016 | Sugawara | ............... | H02P 21/05 |
| 2020/0010111 A1* | 1/2020 | Tsubaki | ............... | B62D 5/0463 |

FOREIGN PATENT DOCUMENTS

| | | |
|---|---|---|
| JP | 2004-066999 A | 3/2004 |
| JP | 2009-132344 A | 6/2009 |
| JP | 2014-073838 A | 4/2014 |

OTHER PUBLICATIONS

Written Opinion issued in corresponding application No. PCT/JP2019/003347 dated Mar. 26, 2019 with English translation.

* cited by examiner

CONTROL DEVICE FOR POWER STEERING DEVICE

TECHNICAL FIELD

The present invention relates to a control device for a power steering device.

BACKGROUND ART

In Patent Literature 1, there is described a technology relating to a control device for an electric power steering device.

CITATION LIST

Patent Literature

PTL 1: JP 2014-73838 A

SUMMARY OF INVENTION

Technical Problem

However, the technology described in Patent Literature 1 has the following problem. When an excessively high steering torque is input, a torque sensor signal value saturates due to a mechanical stopper of a torsion bar or a limit of an output range of a torque sensor, and hence an output value of a high-pass filter or pseudo differentiation calculation, which is used for compensation amount calculation to compensate for a delay system of a power steering device, becomes 0. As a result, the compensation for the delay system becomes ineffective, and a control amount thus presents hunting, resulting in an occurrence of vibration.

Solution to Problem

An object of the present invention is to provide a control device fora power steering device, which is capable of suppressing an occurrence of vibration caused by hunting of a control amount.

According to one embodiment of the present invention, there is provided a control device for a power steering device including a low-pass filter unit including a cutoff frequency adjustment unit configured to adjust a cutoff frequency for partially attenuating a component of an input signal, to set the cutoff frequency to a first cutoff frequency when a steering torque signal is lower than a first predetermined torque value, and to set the cutoff frequency to a second cutoff frequency lower than the first cutoff frequency when the steering torque signal is equal to or higher than the first predetermined torque value.

Thus, the control device for a power steering device according to one embodiment of the present invention can suppress the occurrence of the vibration caused by the hunting of the control amount.

DESCRIPTION OF EMBODIMENTS

First Embodiment

Figure 1:
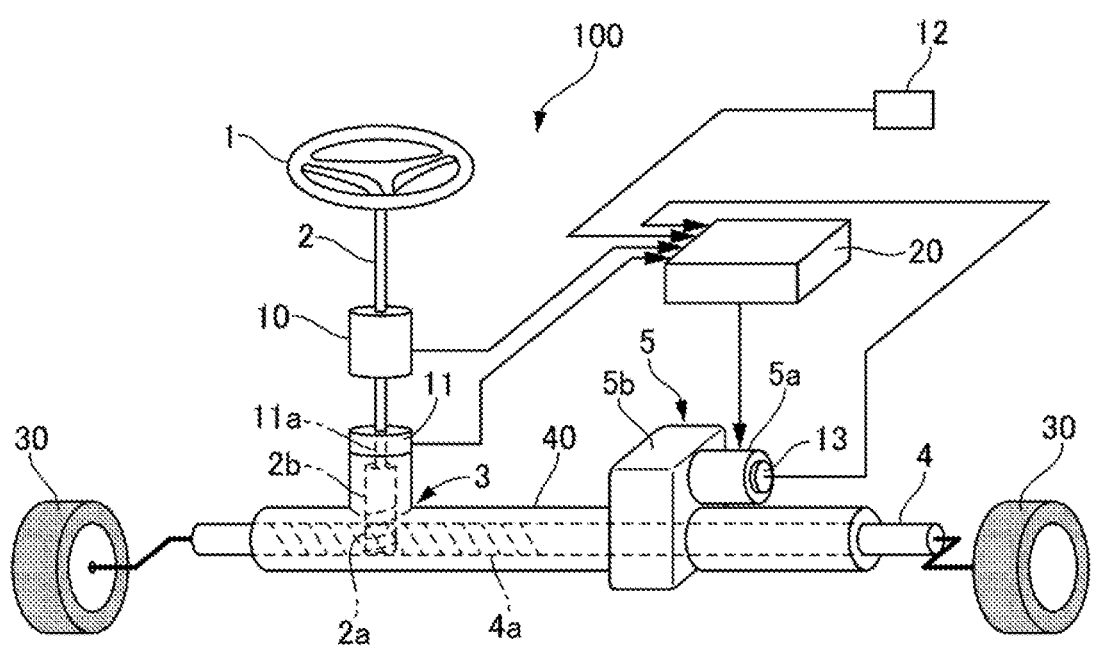
FIG. 1 is a schematic system diagram for illustrating a power steering device as an example to which the present invention is applied.

FIG. 1 is a schematic system diagram for illustrating a power steering device as an example to which the present invention is applied.

(Configuration of Power Steering Device)

A steering shaft 2 serving as an input shaft is connected to a steering wheel 1 of a power steering device 100.

A pinion shaft 2$b$ serving as an output shaft is connected to an end portion of the steering shaft 2 on an opposite side of the steering wheel 1 through the intermediation of a torsion bar 11$a$.

The pinion shaft 2$b$ includes a pinion 2$a$. A connection portion between the pinion 2$a$ and a rack placement portion 40 configured to accommodate a rack bar 4 includes a rack-and-pinion mechanism 3 in which the pinion 2$a$ and rack teeth 4$a$ mesh with each other.

With this configuration, a rotational motion of the steering wheel 1 is converted to an axial motion, to thereby steer steered wheels 30.

The rack placement portion 40 includes a power steering mechanism 5 configured to assist an axial force of the rack bar 4. The power steering mechanism 5 includes an electric motor 5$a$ and a gear mechanism 5$b$. The electric motor 5$a$ serves as an electric actuator. The gear mechanism 5$b$ is configured to convert a torque of the electric motor 5$a$ to an axial force, to thereby apply an assist force to the rack bar 4.

A steering angle sensor 10 is provided on the steering shaft 2, and is configured to detect a steering angle θ, which is a steering wheel steering operation amount of a driver, and is a signal relating to steering angles of the steered wheels. A torque sensor 11 is provided between the steering shaft 2 and the pinion shaft 2$b$. The torque sensor 11 is configured to detect a steering torque of the driver based on a torsion amount of the torsion bar 11$a$. A relative angle between the steering shaft 2 and the pinion shaft 2$b$ corresponds to the torsion amount of the torsion bar. The torque sensor 11 includes a mechanical stopper serving as a rotation restriction portion configured to restrict the relative angle to an angle smaller than a predetermined angle.

A motor rotation angle sensor 13 configured to detect a rotation angle of the electric motor 5a is provided in the electric motor 5a.

Moreover, the vehicle includes a vehicle speed sensor 12 configured to detect a vehicle speed VSP.

The controller 20 includes a microprocessor. The microprocessor is configured to receive signals from the steering angle sensor 10, the torque sensor 11, the vehicle speed sensor 12, and the motor rotation angle sensor 13.

The controller 20 is configured to control currents of the electric motor 5a based on those various signals, to thereby apply an optimal assist force.

Figure 2:
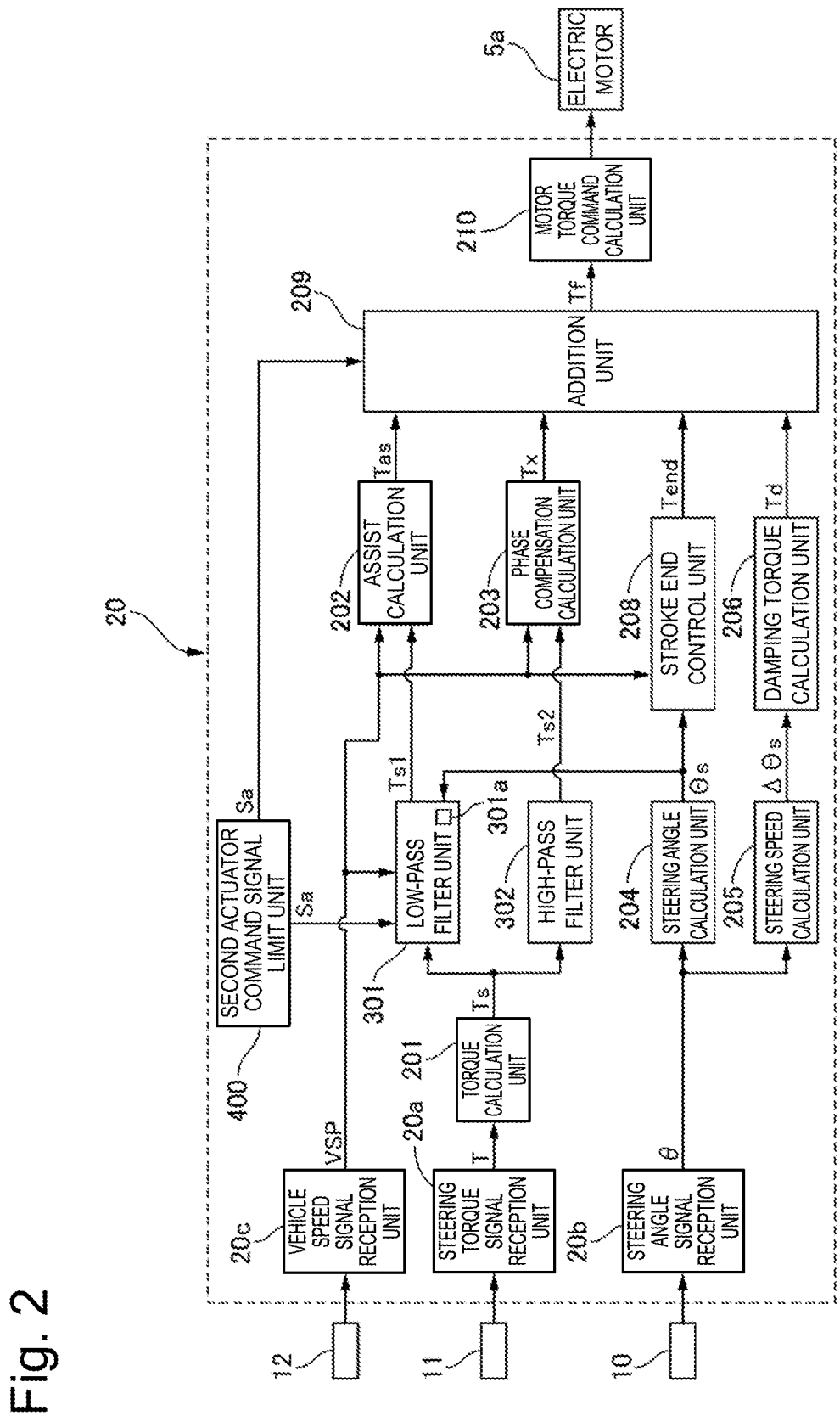
FIG. 2 is a control block diagram for illustrating a control configuration of the power steering device as the example to which the present invention is applied.

FIG. 2 is a control block diagram for illustrating a configuration of a control device for the power steering device as the example to which the present invention is applied.

A torque calculation unit 201 is configured to calculate and generate a steering torque value of the driver based on a steering torque signal T of a steering torque signal reception unit 20a configured to receive the steering torque signal from the torque sensor 11.

The calculated and generated steering torque value is output from the torque calculation unit 201 as a steering torque signal Ts to a low-pass filter unit 301 and a high-pass filter unit 302. The low-pass filter unit 301 includes a cutoff frequency adjustment unit 301a configured to variably set a cutoff frequency to a first cutoff frequency (for example, 10 Hz) and a second cutoff frequency (for example 1 Hz). The high-pass filter unit 302 has a third cutoff frequency higher than the fixed first cutoff frequency.

The low-pass filter unit 301 is formed as a digital filter provided in the microprocessor.

The cutoff frequency of the low-pass filter unit 301 is also referred to as cutoff frequency. The cutoff frequency of the low-pass filter 301 is a frequency used to reduce (attenuate) a gain, which is a ratio of an output to an input of the low-pass filter unit 301, of a component having a frequency equal to or higher than this frequency.

Moreover, the cutoff frequency of the high-pass filter 302 is a frequency used to reduce (attenuate) a gain, which is a ratio of an output to an input of the high-pass filter unit 302, of a component having a frequency lower than this frequency.

An assist calculation unit 202 serving as a first actuator command signal generation unit is configured to calculate and generate an assist torque serving as a first actuator command signal being a reference, based on a steering torque signal Ts1 from the low-pass filter unit 301 and a vehicle speed signal VSP from a vehicle speed signal reception unit 20c configured to receive a vehicle speed signal from a vehicle speed sensor 12, and to output the assist torque as an assist torque signal Tas to an addition unit 209 serving as a second actuator command signal output unit.

A phase compensation calculation unit 203 is configured to calculate and generate, based on a steering torque signal Ts2 from the high-pass filter unit 302 and the vehicle speed signal VSP from the vehicle speed signal reception unit 20c, a phase compensation torque for compensating for a phase difference caused by the torsion bar 11a, which is built into the torque sensor 11 and has low rigidity, to suppress the vibration of the system, and to output the phase compensation torque as a phase compensation torque signal Tx to the addition unit 209.

A steering angle calculation unit 204 is configured to calculate and generate the steering angle of the driver based on a steering angle θ from a steering angle signal reception unit 20b configured to receive a steering angle signal from the steering angle sensor 10, and to output the steering angle as a steering angle signal θs to a stroke end control unit 208.

The stroke end control unit 208 is configured to calculate a stroke end control torque for reducing the assist torque toward a stroke end position of the rack bar 4 based on the vehicle speed signal VSP from the vehicle speed signal reception unit 20c and the steering angle signal θs, and to output the stroke end control torque as a stroke end control torque signal Tend to the addition unit 209.

A steering speed calculation unit 205 is configured to calculate a steering speed of the steering wheel 1 based on the steering angle signal θ from the steering angle signal reception unit 20c, and to output the steering speed as a steering speed signal Δθs to a damping torque calculation unit 206.

The damping torque calculation unit 206 is configured to calculate and generate, based on the steering speed signal Δθs, a damping torque for applying a viscous resistance in order to increase convergence and stability of a vehicle, and to output the damping torque as a damping torque signal Td to the addition unit 209.

The steering torque signal Ts, the assist torque signal Tas, the phase compensation torque signal Tx, the steering angle signal θs, the stroke end control torque signal Tend, the steering speed signal Δθs, the damping torque signal Td, and the like may be generated through calculation by the microprocessor, or through reference to data maps and the like.

The addition unit 209 is configured to calculate and generate an assist torque based on the input assist torque signal Tas, phase compensation torque signal Tx, stroke end control torque signal Tend, and damping torque signal Td, and to output an assist torque signal Tf serving as a second actuator command signal to a motor torque command calculation unit 210.

The motor torque command calculation unit 210 is configured to determine current values directed to the electric motor 5a based on the assist torque signal Tf calculated and generated by the addition unit 209, and to output the current values to the electric motor 5a.

Moreover, information, such as overheat states of the electric motor 5a and an inverter (not shown), and a decrease in power supply voltage of a battery (not shown), is input to a second actuator command signal limit unit 400. The second actuator command signal limit unit 400 is configured to output a control limit command signal Sa to the low-pass filter unit 301 and the addition unit 209 in order to execute second actuator command signal limiting control of reducing an upper limit value of the assist torque signal Tf serving as the second actuator command signal or limiting the output of the assist torque signal Tf serving as the second actuator command signal when electric power consumption or heat generation of the electric motor 5a is required to be suppressed.

Moreover, when the control limit command signal Sa is input to the cutoff frequency adjustment unit 301a of the low-pass filter unit 301, the cutoff frequency adjustment unit 301a sets the cutoff frequency to the second cutoff frequency (for example, 1 Hz).

Figure 3:
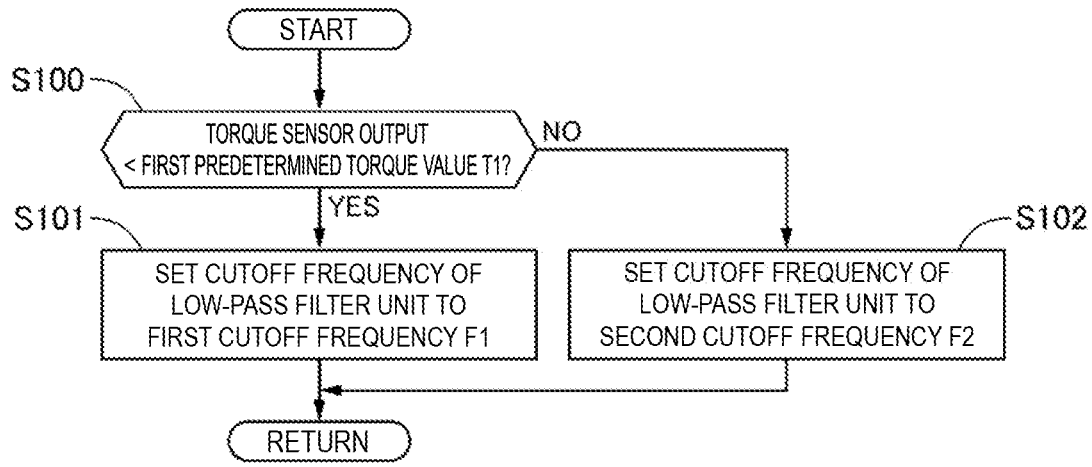
FIG. 3 is a flowchart for illustrating control processing in a first embodiment of the present invention.

FIG. 3 is a flowchart for illustrating control processing in a first embodiment of the present invention. This flowchart is repeatedly executed at predetermined calculation cycles.

In Step S100, it is determined whether or not the steering torque signal T (=steering torque signal Ts output by the torque calculation unit 201) of the steering torque signal reception unit 20a configured to receive the steering torque signal from the torque sensor 11 is lower than a first predetermined torque value (for example, 10 Nm).

The torque sensor 11 is configured such that the mechanical stopper is activated at a torsion angle corresponding to a torque (for example, 12 Nm) higher than the first predetermined torque value.

When the steering torque signal T (=steering torque signal Ts output by the torque calculation unit 201) of the steering torque signal reception unit 20a configured to receive the steering torque signal from the torque sensor 11 is lower than the first predetermined torque value T1, the processing proceeds to Step S101. When the steering torque signal T (=steering torque signal Ts output by the torque calculation unit 201) of the steering torque signal reception unit 20a is equal to or higher than the first predetermined torque value T1, the processing proceeds to Step S102.

In Step S101, the cutoff frequency set by the cutoff frequency adjustment unit 301a of the low-pass filter unit 301 is set to the first cutoff frequency F1 (for example, 10 Hz).

Moreover, in Step S102, the cutoff frequency set by the cutoff frequency adjustment unit 301a of the low-pass filter unit 301 is set to the second cutoff frequency F2 (for example, 1 Hz).

That is, the second cutoff frequency F2 is set to a frequency lower than the first cutoff frequency F1.

Figure 4:
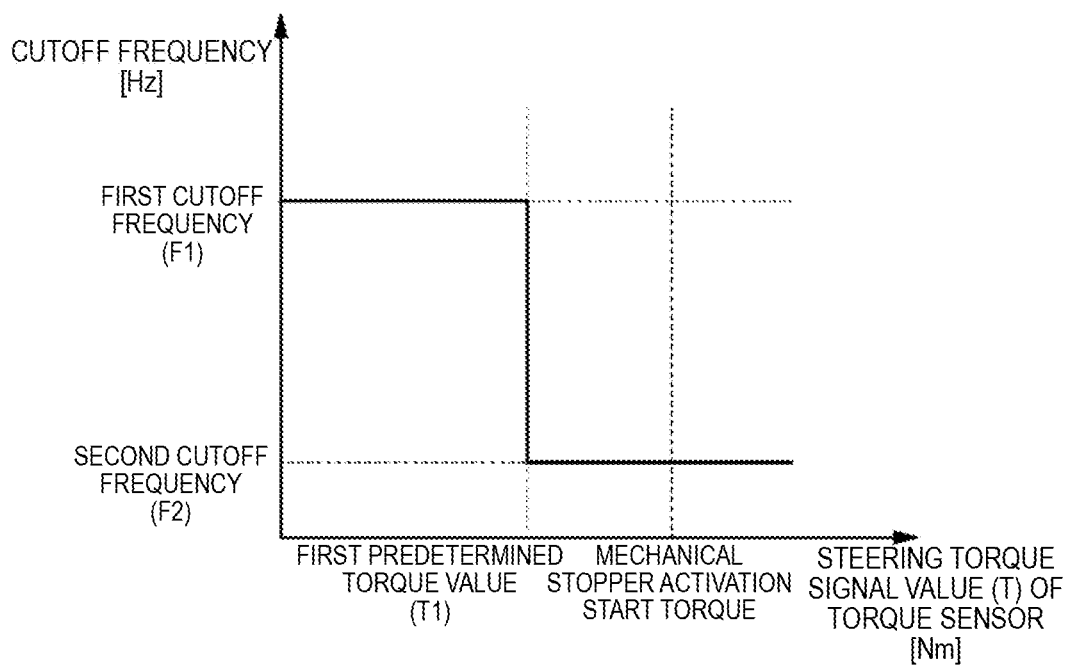
FIG. 4 is a conceptual diagram for illustrating the control processing in the first embodiment.

FIG. 4 is a conceptual diagram for illustrating the control processing in the first embodiment.

The horizontal axis represents the steering torque signal T (=steering torque signal Ts output by the torque calculation unit 201) output by the steering torque signal reception unit 20a configured to receive the steering torque signal from the torque sensor 11. The vertical axis represents the cutoff frequency of the low-pass filter unit 301.

Until the steering torque signal T (=steering torque signal Ts output by the torque calculation unit 201) output by the steering torque signal reception unit 20a configured to receive the steering torque signal from the torque sensor 11 becomes lower than the first predetermined torque value T1 (for example 10 Nm), the cutoff frequency is set to the first cutoff frequency F1 (for example 10 Hz). When the steering torque signal T (=steering torque signal Ts output by the torque calculation unit 201) output by the steering torque signal reception unit 20a configured to receive the steering torque signal from the torque sensor 11 reaches the first predetermined torque value T1, the cutoff frequency is switched to the second cutoff frequency (for example 1 Hz).

Therefore, when the steering torque signal T (=steering torque signal Ts output by the torque calculation unit 201) output by the steering torque signal reception unit 20a configured to receive the steering torque signal from the torque sensor 11 reaches the torque value (for example 12 Nm) at which the mechanical stopper is activated, the cutoff frequency has already been switched to the second cutoff frequency F2 (for example, 1 Hz).

Figure 5B:
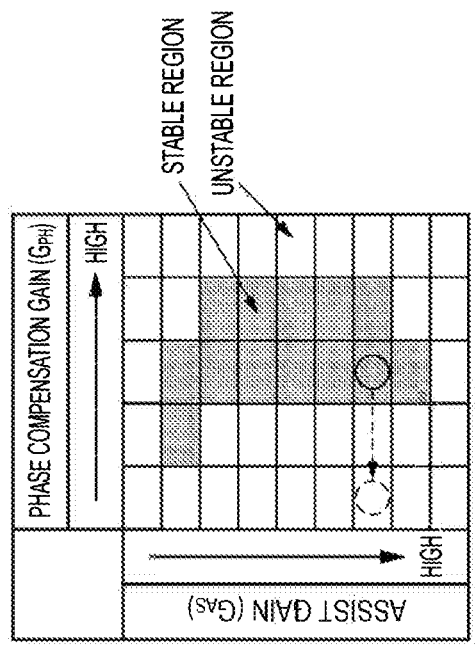
FIG. 5($a$) is a graph for showing steering torque signal characteristics in the first embodiment and a comparative example, and FIG. 5($b$) is a diagram for illustrating region characteristics in the first embodiment and the comparative example.
Figure 5A:
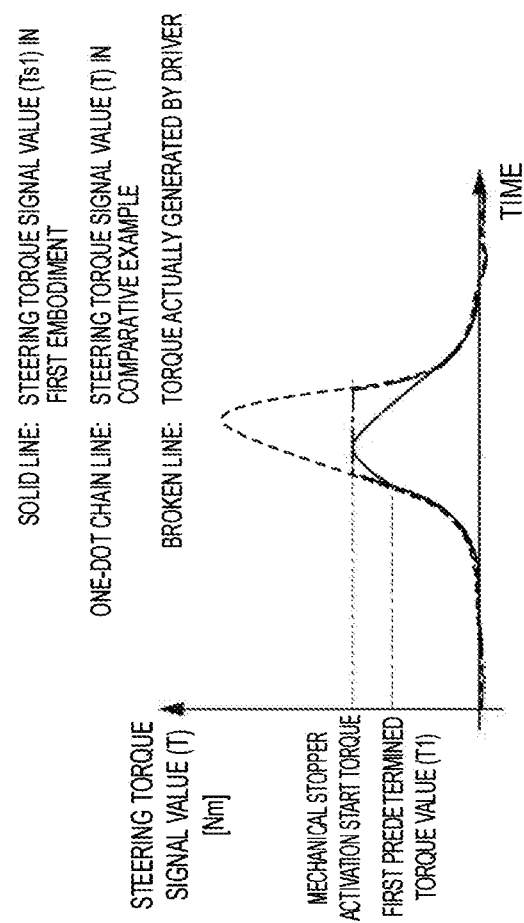

FIG. 5(a) is a graph for showing steering torque signal characteristics in the first embodiment and a comparative example. FIG. 5(b) is a diagram for illustrating region characteristics in the first embodiment and the comparative example.

The solid line of FIG. 5(a) represents the steering torque signal Ts1 output by the low-pass filter unit 301 in the first embodiment. The one-dot chain line represents a steering torque signal T of the torque sensor in the comparative example. The broke line represents a change in steering torque actually generated by the driver.

In the case of the comparative example, after the activation of the mechanical stopper of the torque sensor 11 starts, the steering torque signal of the torque sensor is constant.

In the case of the first embodiment, when the steering torque signal T (=steering torque signal Ts output by the torque calculation unit 201) of the steering torque signal reception unit 20a configured to receive the steering torque signal from the torque sensor 11 reaches the first predetermined torque value T1, the cutoff frequency of the low-pass filter unit 301 is switched from the first cutoff frequency F1 to the second cutoff frequency F2. Then, the gain, which is the ratio of the output to the input of the low-pass filter unit 301, is thus reduced (attenuated) for the component having a frequency equal to or higher than the second cutoff frequency F2, resulting in the steering torque signal Ts1 represented as the solid line.

FIG. 5(b) is a matrix in which the horizontal axis represents a phase compensation gain, and the vertical axis represents an assist gain. The hatched region represents a stable region.

The comparative example is represented by the broken line circle, and is moved to an unstable region due to the saturation of the steering torque signal of the torque sensor. In contrast, the solid line circle representing the first embodiment exists in the stable region.

As described above, the steering torque signal Ts1 having passed through the low-pass filter unit 301 does not saturate, and hence the assist calculation unit 202 calculates and generates the assist torque serving as the first actuator command signal being the reference, based on the steering torque signal Ts1 from the low-pass filter unit 301 and the vehicle speed signal VSP from the vehicle speed signal reception unit 20c configured to receive the vehicle speed signal from the vehicle speed sensor 12, and outputs the assist torque as the assist torque signal Tas to the addition unit 209. As a result, a problem of an occurrence of vibration caused by hunting of the control amount does not occur.

Actions and effects of the first embodiment are listed below. (1) The control device for a power steering device according to the present invention includes the low-pass filter unit 301 including the cutoff frequency adjustment unit 301a. The cutoff frequency adjustment unit 301a is configured to adjust the cutoff frequency for partially attenuating the component of the input signal, set the cutoff frequency to the first cutoff frequency F1 when the steering torque signal T (=steering torque signal Ts output by the torque calculation unit 201) of the steering torque signal reception unit 20a configured to receive the steering torque signal from the torque sensor 11 is lower than the first predetermined torque value T1, and to set the cutoff frequency to the second cutoff frequency F2 lower than the first cutoff frequency F1 when the steering torque signal T (=steering torque signal Ts output by the torque calculation unit 201) of the steering torque signal reception unit 20a configured to receive the steering torque signal from the torque sensor 11 is equal to or higher than the first predetermined torque value T1.

Thus, it is possible to suppress the hunting of the output of the electric motor 5a when the steering torque signal T of the steering torque signal reception unit 20a configured to receive the steering torque signal from the torque sensor 11 is equal to or higher than the first predetermined torque value T1 while securing steering response provided when the steering torque signal T (=steering torque signal Ts output by the torque calculation unit 201) of the steering torque signal reception unit 20a configured to receive the steering torque signal from the torque sensor 11 is lower than the first predetermined torque value T1.

(2) The first predetermined torque value T1 is a value lower than the value of the steering torque signal T of the torque sensor 11 at the predetermined angle at which the activation of the mechanical stopper of the torque sensor 11 is started.

Thus, the relative angle between the steering shaft 2 and the pinion shaft 2b does not increase any more when the relative angle reaches the predetermined angle at which the actuation of the mechanical stopper of the torque sensor 11 is started. The torque sensor 11 is configured to output the steering torque signal T based on the relative angle between the steering shaft 2 and the pinion shaft 2b. Thus, the steering torque signal T also reaches an upper limit value when the relative angle between the steering shaft 2 and the pinion shaft 2b reaches the predetermined angle, and does not increases any more to maintain the constant value. The gain of the high-pass filter unit 302 becomes zero when the steering torque signal T, which is the output from the torque sensor 11, does not change as the time elapses. Consequently, the assist torque signal Tf calculated and generated by the addition unit 209 becomes unstable, and there is a fear in that the output of the electric motor 5a may present the hunting. Thus, when the steering torque reaches the upper limit value, the cutoff frequency adjustment unit 301a is only required to set the cutoff frequency to the second cutoff frequency F2. In this configuration, the hunting suppression effect can stably be provided by setting the first predetermined torque value T1 to the value lower than the upper limit value of the steering torque, to thereby provide a margin.

(3) The low-pass filter unit 301 is provided on an upstream side of the assist calculation unit 202 serving as the first actuator command signal generation unit.

Thus, the assist torque signal Tas serving as the first actuator command signal calculated and generated by the assist calculation unit 202 is not influenced by the low-pass filter unit 301, and hence tuning of an output characteristic (assist gain) with respect to the signal input to the assist calculation unit 202 is facilitated.

(4) The low-pass filter unit 301 is formed as the digital filter provided in the microprocessor.

Thus, the cutoff frequency is adjusted through the processing in the microprocessor, and hence the cutoff frequency can be adjusted more freely than when the cutoff frequency is adjusted by an electronic circuit.

Second Embodiment

Figure 6:
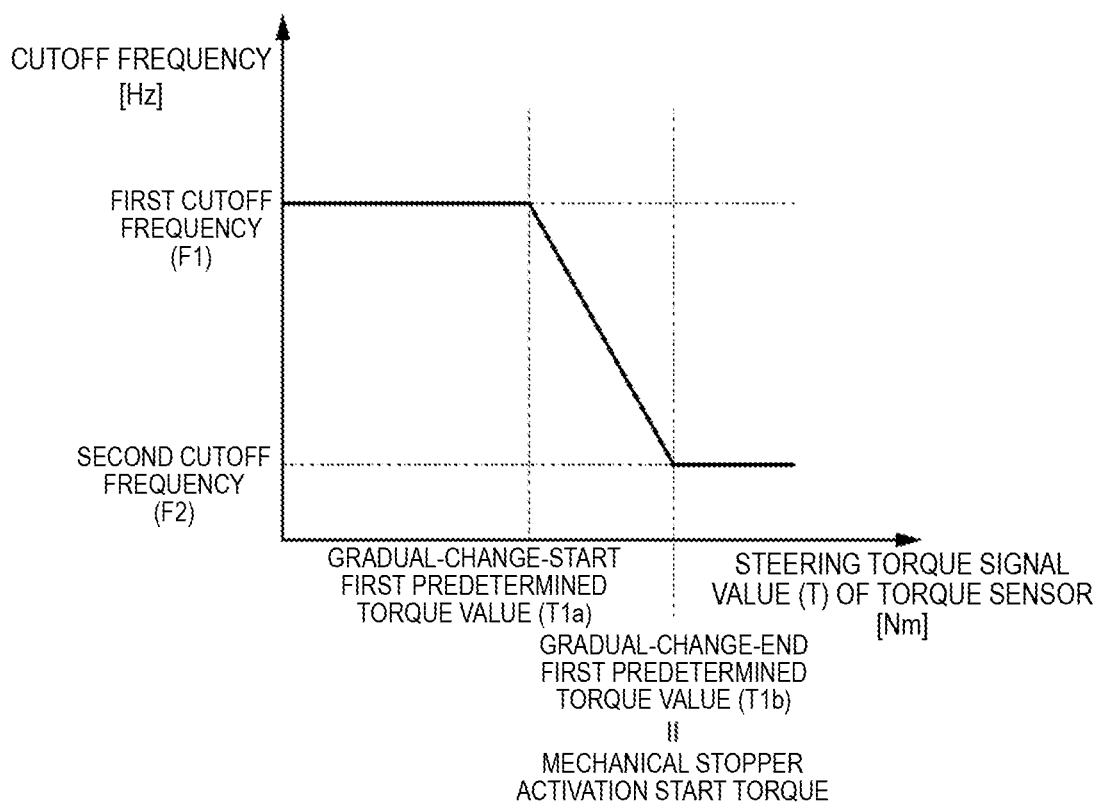
FIG. 6 is a conceptual diagram for illustrating control processing in a second embodiment of the present invention.

FIG. 6 is a conceptual diagram for illustrating control processing in a second embodiment of the present invention.

Unlike in the first embodiment, when the steering torque signal T (=steering torque signal Ts output by the torque calculation unit 201) of the steering torque signal reception unit 20a configured to receive the steering torque signal from the torque sensor 11 reaches a gradual-change-start first predetermined torque value T1a, the cutoff frequency adjustment unit 301a gradually changes (gradually reduces) the cutoff frequency from the first cutoff frequency F1 to the second cutoff frequency F2 at a gradual-change-end first predetermined torque value T1b.

That is, the gradual-change-start first predetermined torque value T1a and the gradual-change-end first predetermined torque value T1b are set as two first predetermined torque values T1, and the cutoff frequency is gradually changed (gradually reduced) from the first cutoff frequency F1 to the second cutoff frequency F2 between the gradual-change-start first predetermined torque value T1a and the gradual-change-end first predetermined torque value T1b.

In this configuration, the gradual-change-end first predetermined torque value T1b and the mechanical stopper activation start torque match each other.

The other configurations and actions are the same as those of the first embodiment, and description thereof is therefore omitted.

Actions and effects of the second embodiment are listed below.

The cutoff frequency adjustment unit 301a is configured to gradually change (gradually reduce) the cutoff frequency from the first cutoff frequency F1 to the second cutoff frequency F2.

Thus, the change in cutoff frequency may influence the assist torque Tf serving as the second actuator command signal, but an occurrence of a rapid change in assist torque Tf can be suppressed through the gradual change (gradual reduction) of the cutoff frequency.

The other actions and effects are the same as those of the first embodiment.

Third Embodiment

Figure 7:
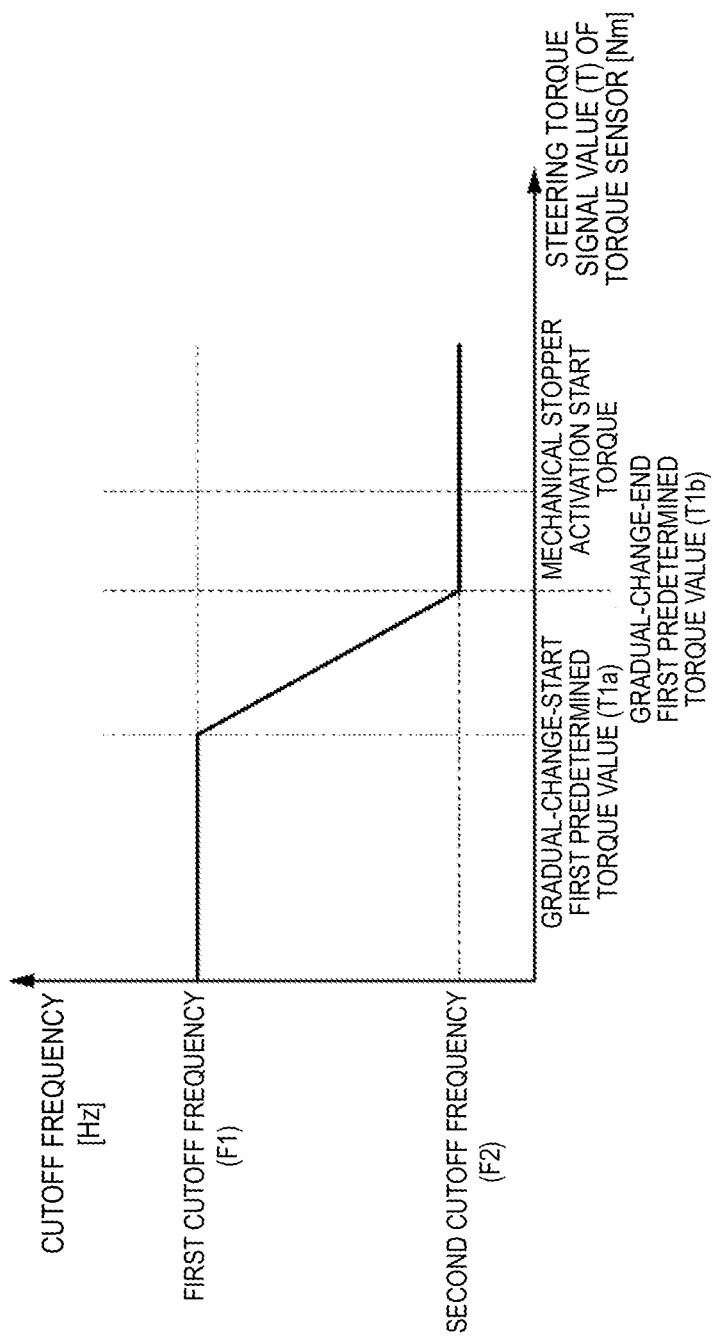
FIG. 7 is a conceptual diagram for illustrating control processing in a third embodiment of the present invention.

FIG. 7 is a conceptual diagram for illustrating control processing in a third embodiment of the present invention.

Unlike in the second embodiment, the gradual-change-start first predetermined torque value T1a and the gradual-change-end first predetermined torque value T1b are set as two first predetermined torque values T1, and the cutoff frequency is gradually changed (gradually reduced) from the first cutoff frequency F1 to the second cutoff frequency F2 between the gradual-change-start first predetermined torque value T1a and the gradual-change-end first predetermined torque value T1b, but the cutoff frequency is set to reach the second cutoff frequency before the steering torque signal value reaches the mechanical stopper activation start torque of the torque sensor 11.

That is, the gradual-change-end first predetermined torque value T1b is set to a torque lower than the mechanical stopper activation start torque.

The other configurations and actions are the same as those of the second embodiment, and description thereof is therefore omitted.

Actions and effects of the third embodiment are listed below.

The cutoff frequency adjustment unit 301a is configured to gradually change (gradually reduce) the cutoff frequency from the first cutoff frequency F1 to the second cutoff frequency F2, but to cause the cutoff frequency to reach the second cutoff frequency before the steering torque signal value reaches the mechanical stopper activation start torque of the torque sensor 11.

Thus, the effect of suppressing the hunting can stably be provided by sufficiently reducing the cutoff frequency before the activation of the mechanical stopper.

The other actions and effects are the same as those of the second embodiment.

Fourth Embodiment

Figure 8:
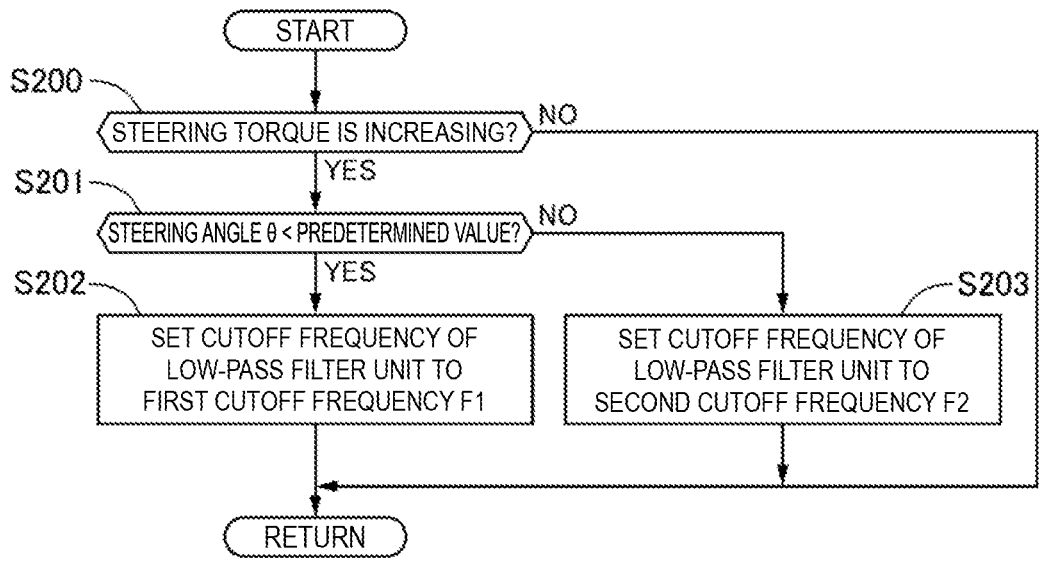
FIG. 8 is a flowchart for illustrating control processing in a fourth embodiment of the present invention.

FIG. 8 is a flowchart for illustrating control processing in a fourth embodiment of the present invention. This flowchart is repeatedly executed at predetermined calculation cycles.

In Step S200, it is determined whether or not the steering torque is increasing (the steering operation is being executed toward a steering progressing direction).

When the steering torque is increasing, the processing proceeds to Step S201. When the steering torque is not increasing, the control is finished.

In Step S201, it is determined whether or not the steering angle signal θ (=steering angle signal θs output by the steering angle calculation unit 204) from the steering angle signal reception unit 20c configured to receive the steering angle signal from the steering angle sensor 10 is smaller than a predetermined value before a stroke end steering angle.

When the steering angle signal θ (=steering angle signal θs output by the steering angle calculation unit 204) from the steering angle signal reception unit 20c configured to receive the steering angle signal from the steering angle sensor 10 is smaller than the predetermined value, the processing proceeds to Step S202. When the steering angle signal θ (=steering angle signal θs output by the steering angle calculation unit 204), which is the output of the steering angle sensor 10, is equal to or larger than the predetermined value, the processing proceeds to Step S203.

In Step S202, the cutoff frequency set by the cutoff frequency adjustment unit 301a of the low-pass filter unit 301 is set to the first cutoff frequency F1 (for example, 10 Hz).

Moreover, in Step S203, the cutoff frequency set by the cutoff frequency adjustment unit 301a of the low-pass filter unit 301 is set to the second cutoff frequency F2 (for example, 1 Hz).

Figure 9:
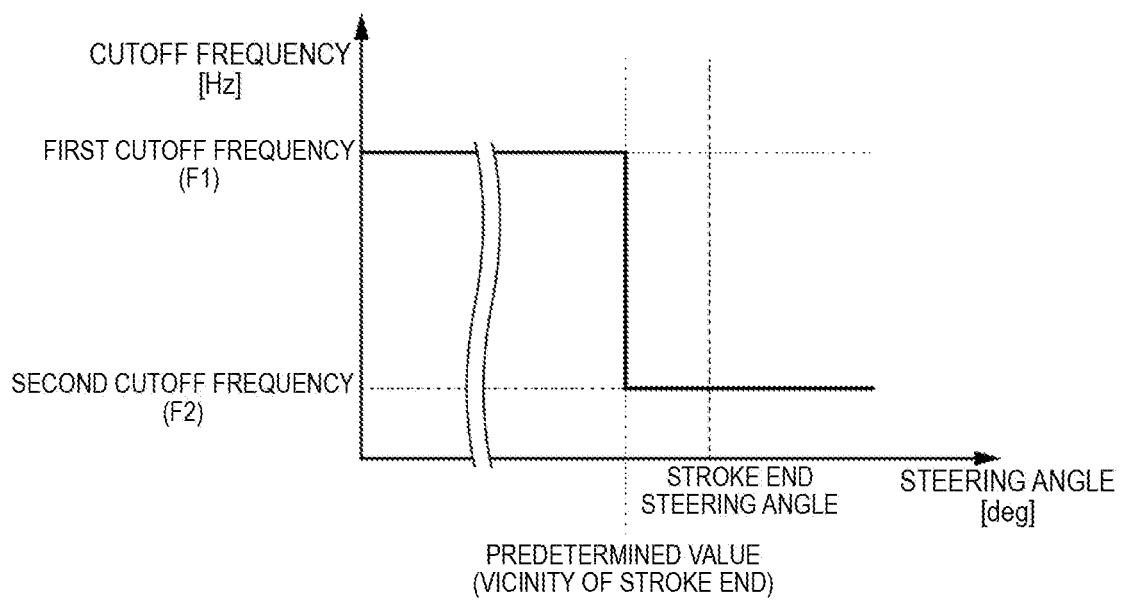
FIG. 9 is a conceptual diagram for illustrating the control processing in the fourth embodiment.

FIG. 9 is a conceptual diagram for illustrating control processing in the fourth embodiment.

The horizontal axis represents the steering angle signal θ (=steering angle signal θs output by the steering angle calculation unit 204) from the steering angle signal reception unit 20c configured to receive the steering angle signal from the steering angle sensor 10. The vertical axis represents the cutoff frequency of the low-pass filter unit 301.

In addition to the configuration of the first embodiment, the cutoff frequency is set to the first cutoff frequency when the steering torque is increasing, and the steering angle signal θ (=steering angle signal θs output by the steering angle calculation unit 204) from the steering angle signal reception unit 20c configured to receive the steering angle signal from the steering angle sensor 10 is smaller than the predetermined value before the stroke end steering angle. Moreover, the cutoff frequency is set to the second cutoff frequency F2 lower than the first cutoff frequency F1 when the steering torque is increasing, and the steering angle signal θ (=steering angle signal θs output by the steering angle calculation unit 204) from the steering angle signal reception unit 20c configured to receive the steering angle signal from the steering angle sensor 10 is equal to or larger than the predetermined value before the stroke end steering angle.

The other configurations and actions are the same as those of the first embodiment, and description thereof is therefore omitted.

Actions and effects of the fourth embodiment are listed below.

The cutoff frequency is set to the first cutoff frequency F1 when the steering torque is increasing, and the steering angle signal θ (=steering angle signal θs output by the steering angle calculation unit 204) from the steering angle signal reception unit 20c configured to receive the steering angle signal from the steering angle sensor 10 is smaller than the predetermined value before the stroke end steering angle. Moreover, the cutoff frequency is set to the second cutoff frequency F2 lower than the first cutoff frequency F1 when the steering torque is increasing, and the steering angle signal θ (=steering angle signal θs output by the steering angle calculation unit 204) from the steering angle signal reception unit 20c configured to receive the steering angle signal from the steering angle sensor 10 is equal to or larger than the predetermined value before the stroke end steering angle.

Thus, in a case where the steering angle signal θ (=steering angle signal θs output by the steering angle calculation unit 204) from the steering angle signal reception unit 20c configured to receive the steering angle signal from the steering angle sensor 10 represents a value equal to or larger than the predetermined value close to the stroke end, and the steering operation is being executed toward the steering progressing direction (the steering torque is increasing), when the steering operation still continues, the rack bar 4 reaches the stroke end, and the steered wheels can no longer be steered (the pinion shaft 2b no longer rotates). As a result, the relative angle between the steering shaft 2 and the pinion shaft 2b rapidly increases. A state in which a risk of the occurrence of the hunting is high can stably be avoided by estimating the approach to this state from the steering angle signal and the steering torque signal to reduce the cutoff frequency in advance.

The other actions and effects are the same as those of the first embodiment.

Fifth Embodiment

Figure 10:
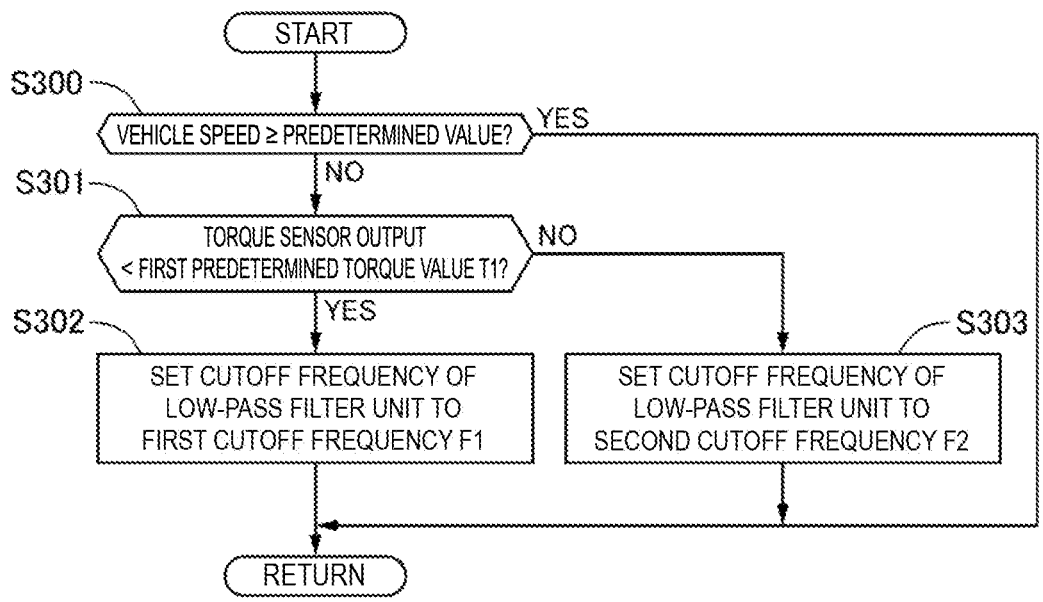
FIG. 10 is a flowchart for illustrating control processing in a fifth embodiment of the present invention.

FIG. 10 is a flowchart for illustrating control processing in a fifth embodiment of the present invention. This flowchart is repeatedly executed at predetermined calculation cycles.

In Step S300, it is determined whether or not the vehicle speed signal VSP from the vehicle speed signal reception unit 20c configured to receive the vehicle speed signal from the vehicle speed sensor 12 is equal to or higher than a predetermined value.

When the vehicle speed signal VSP from the vehicle speed signal reception unit 20c configured to receive the vehicle speed signal from the vehicle speed sensor 12 is lower than the predetermined value, the processing proceeds to Step S301. When the vehicle speed signal VSP from the vehicle speed signal reception unit 20c configured to receive the vehicle speed signal from the vehicle speed sensor 12 is equal to or higher than the predetermined value, the control is finished.

In Step S301, it is determined whether or not the steering torque signal T (=steering torque signal Ts output by the torque calculation unit 201) from the steering torque signal reception unit 20a configured to receive the steering torque signal from the torque sensor 11 is lower than the first predetermined torque value T1.

When the steering torque signal T (=steering torque signal Ts output by the torque calculation unit 201) from the steering torque signal reception unit 20a configured to receive the steering torque signal from the torque sensor 11 is lower than the first predetermined torque value T1, the processing proceeds to Step S302. When the steering torque signal T (=steering torque signal Ts output by the torque calculation unit 201) of the torque sensor 11 is equal to or higher than the first predetermined torque value T1, the processing proceeds to Step S303.

In Step S302, the cutoff frequency set by the cutoff frequency adjustment unit 301a of the low-pass filter unit 301 is set to the first cutoff frequency F1 (for example, 10 Hz).

Moreover, in Step S303, the cutoff frequency set by the cutoff frequency adjustment unit 301a of the low-pass filter unit 301 is set to the second cutoff frequency F2 (for example, 1 Hz).

That is, in addition to the configuration of the first embodiment, when the vehicle speed is equal to or higher than the predetermined value, the change in cutoff frequency to the second cutoff frequency F2 is inhibited.

The other configurations and actions are the same as those of the first embodiment, and description thereof is therefore omitted.

Actions and effects of the fifth embodiment are listed below.

When the vehicle speed is equal to or higher than the predetermined vehicle speed, the change in cutoff frequency to the second cutoff frequency F2 is inhibited.

Thus, responsiveness can be secured in an emergency steering avoidance operation during a high- or medium-speed travel.

The steering torque value is equal to or higher than a predetermined value during the high- or medium-speed travel, and hence the risk of the occurrence of the hunting of the output of the electric motor 5a is also low.

The other actions and effects are the same as those of the first embodiment.

Sixth Embodiment

Figure 11:
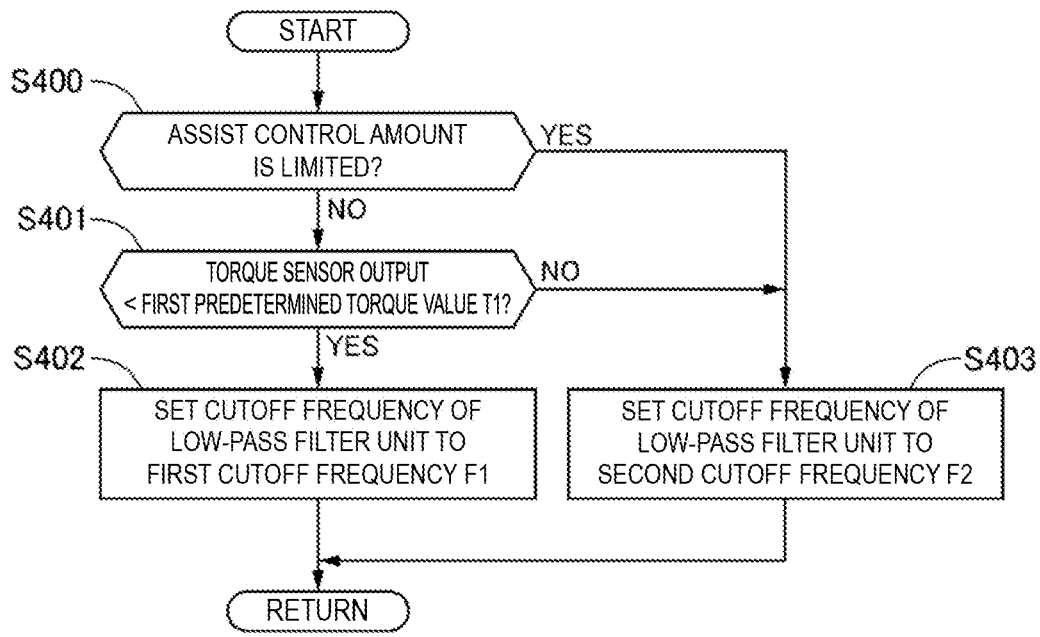
FIG. 11 is a flowchart for illustrating control processing in a sixth embodiment of the present invention.

FIG. 11 is a flowchart for illustrating control processing in a sixth embodiment of the present invention. This flowchart is repeatedly executed at predetermined calculation cycles.

In Step S400, it is determined whether or not the limitation on the assist control amount is executed, that is, the control limit command signal Sa is output by the second actuator command signal limit unit 400.

When the power consumption or the heat generation of the electric motor 5a is required to be suppressed, the second actuator command signal limit unit 400 outputs the control limit command signal Sa to the low-pass filter unit 301 and the addition unit 209 in order to execute the second actuator command signal limiting control of reducing the upper limit value of the assist torque Tf serving as the second actuator command signal or limiting the output of the assist torque Tf.

When the limitation on the assist control amount is not being executed, the processing proceeds to Step S401. When the limitation on the assist control amount is being executed, the processing proceeds to Step S403.

In Step S401, it is determined whether or not the steering torque signal T (=steering torque signal Ts output by the torque calculation unit 201) from the steering torque signal reception unit 20a configured to receive the steering torque signal from the torque sensor 11 is lower than the first predetermined torque value T1.

When the steering torque signal T (=steering torque signal Ts output by the torque calculation unit 201) from the steering torque signal reception unit 20a configured to receive the steering torque signal from the torque sensor 11 is lower than the first predetermined torque value T1, the processing proceeds to Step S402. When the steering torque signal T (=steering torque signal Ts output by the torque calculation unit 201) of the torque sensor 11 is equal to or higher than the first predetermined torque value T1, the processing proceeds to Step S403.

In Step S402, the cutoff frequency set by the cutoff frequency adjustment unit 301a of the low-pass filter unit 301 is set to the first cutoff frequency F1 (for example, 10 Hz).

Further, in Step S403, the cutoff frequency set by the cutoff frequency adjustment unit 301a of the low-pass filter unit 301 is set to the second cutoff frequency F2 (for example, 1 Hz).

That is, in addition to the configuration of the first embodiment, when the limitation on the assist control amount is being executed, the cutoff frequency is changed to the second cutoff frequency F2.

The other configurations and actions are the same as those of the first embodiment, and description thereof is therefore omitted.

Actions and effects of the sixth embodiment are listed below.

When the assist control amount is being limited, the cutoff frequency is changed to the second cutoff frequency F2.

Thus, the consumption of the electric power and the heat generation in the electric motor 5a can be further suppressed by reducing responsiveness of the drive of the electric motor 5a to reduce an amount of work per unit time.

The other actions and effects are the same as those of the first embodiment.

Seventh Embodiment

Figure 12:
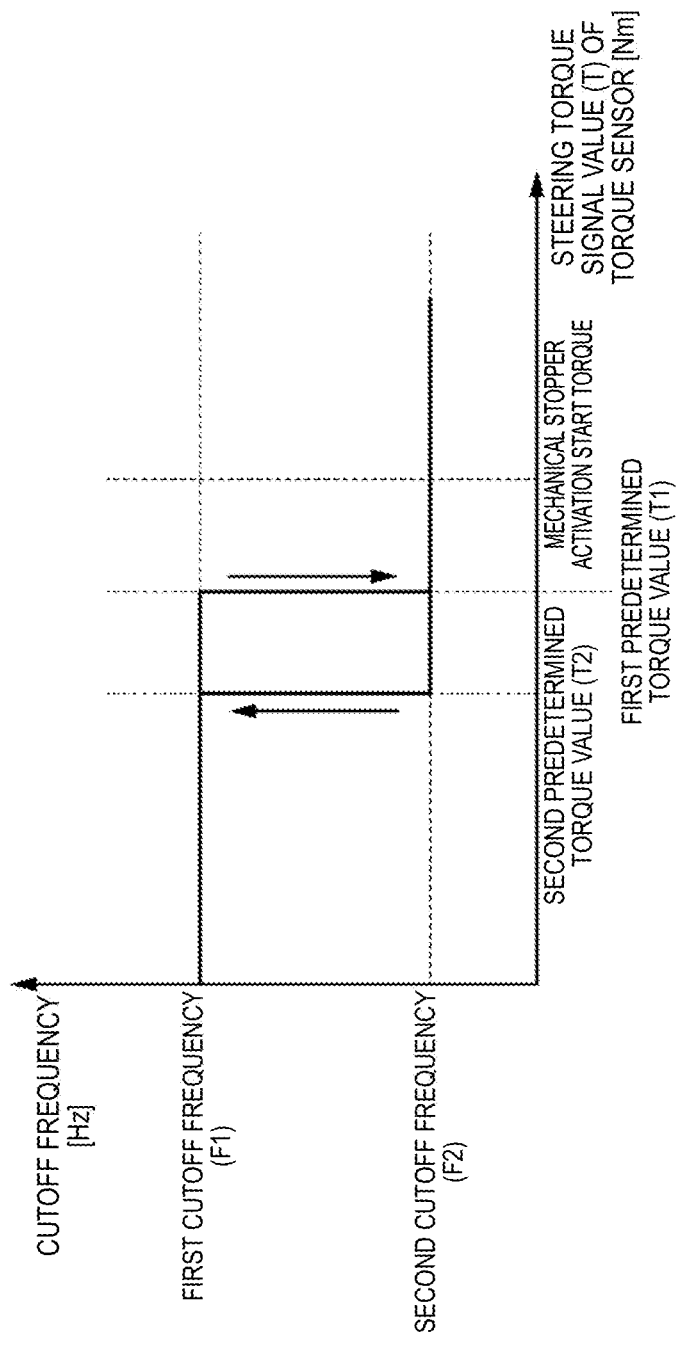
FIG. 12 is a conceptual diagram for illustrating control processing in a seventh embodiment of the present invention.

FIG. 12 is a conceptual diagram for illustrating control processing in a seventh embodiment of the present invention.

The horizontal axis represents the steering torque signal T (=steering torque signal Ts output by the torque calculation unit 201) from the steering torque signal reception unit 20a configured to receive the steering torque signal from the torque sensor 11. The vertical axis represents the cutoff frequency of the low-pass filter unit 301.

In addition to the configuration of the first embodiment, when the steering torque signal T (=steering torque signal Ts output by the torque calculation unit 201) from the steering torque signal reception unit 20a configured to receive the steering torque signal from the torque sensor 11 increases from a torque lower than the first predetermined torque value T1 to reach the first predetermined torque value T1, the cutoff frequency is set to the second cutoff frequency F2 (for example, 1 Hz). When the steering torque signal T (=steering torque signal Ts output by the torque calculation unit 201) from the steering torque signal reception unit 20a configured to receive the steering torque signal from the torque sensor 11 decreases from a torque higher than the first predetermined torque value T1 to reach the second predetermined torque value T2 lower than the first predetermined torque value T1, the cutoff frequency is set to the first cutoff frequency F1 (for example, 10 Hz).

The other configurations and actions are the same as those of the first embodiment, and description thereof is therefore omitted.

Actions and effects of the seventh embodiment are listed below.

There is provided a so-called hysteresis characteristic in which a threshold value of the predetermined torque value, which is used to switch the setting between the first cutoff frequency F1 and the second cutoff frequency F2, is changed between the increase and the decrease in steering torque.

Thus, when the steering torque increases or decreases in a vicinity of the first predetermined torque value T1, it is possible to suppress a frequent change in cutoff frequency.

The other actions and effects are the same as those of the first embodiment.

Figure 13:
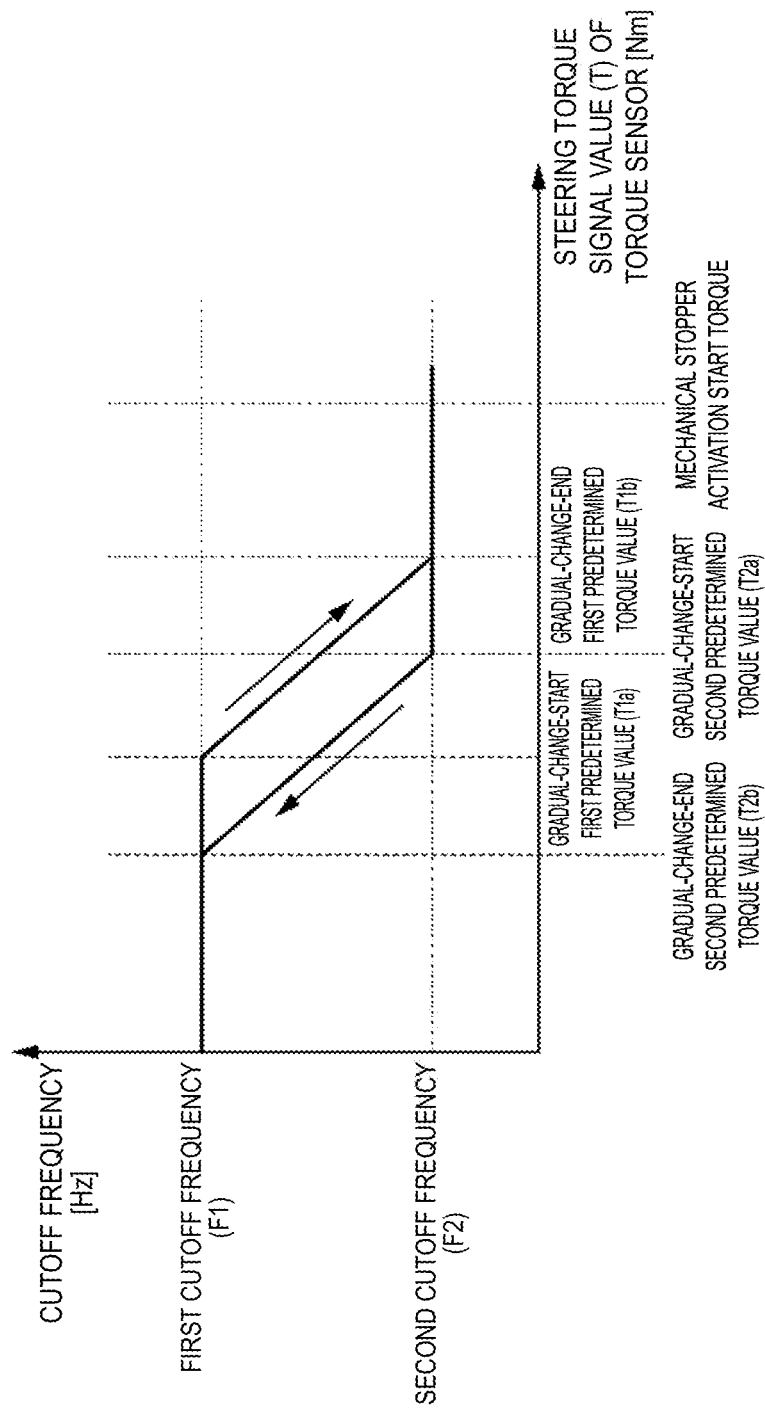
FIG. 13 is a conceptual diagram for illustrating control processing in an eighth embodiment of the present invention.

FIG. 13 is a conceptual diagram for illustrating control processing in an eighth embodiment of the present invention.

The horizontal axis represents the steering torque signal T (=steering torque signal Ts output by the torque calculation unit 201) from the steering torque signal reception unit 20a configured to receive the steering torque signal from the torque sensor 11. The vertical axis represents the cutoff frequency of the low-pass filter unit 301.

Unlike in the seventh embodiment, the gradual-change-start first predetermined torque value T1a and the gradual-change-end first predetermined torque value T1b are set as two first predetermined torque values T1, and the cutoff frequency is gradually changed (gradually reduced) from the first cutoff frequency F1 to the second cutoff frequency F2 between the gradual-change-start first predetermined torque value T1a and the gradual-change-end first predetermined torque value T1b, and a gradual-change-start second predetermined torque value T2a and a gradual-change-end second predetermined torque value T2b are also set as two second predetermined torque values T2, and the cutoff frequency is gradually changed (gradually increased) from the second cutoff frequency F2 to the first cutoff frequency F1.

In this configuration, a relationship among the respective predetermined torques are set such that the relationship of "gradual-change-end second predetermined torque value T2b<gradual-change-start first predetermined torque value T1a<gradual-change-start second predetermined torque value T2a<gradual-change-end first predetermined torque value T1b" is satisfied.

The other configurations and actions are the same as those of the seventh embodiment, and description thereof is therefore omitted.

There is provided the so-called hysteresis characteristic in which the threshold value of the predetermined torque value, which is used to switch the setting between the first cutoff frequency and the second cutoff frequency, is changed between the increase and the decrease in steering torque, and the switching of the setting between the first cutoff frequency and the second cutoff frequency is gradually changed (gradually reduced or gradually increased).

Thus, it is possible to suppress the frequent change in cutoff frequency when the steering torque increases or decreases in the vicinity of the first predetermined torque, and to suppress the occurrence of a rapid change in assist torque Tf through the gradual change (gradual reduction or gradual increase) in cutoff frequency.

Other Embodiments

The embodiments of the present invention have been described above. However, the specific configuration of the present invention is not limited to the configuration described in each of the embodiments. A change in design and the like without departing from the scope of the gist of the invention are also encompassed in the present invention.

Description has been given of the rack-and-pinion type as the type of the power steering device, but the type of the power steering device is not limited to this type, and a ball screw type as another type is also encompassed in the present invention.

Moreover, description has been given of the example in which the assist calculation unit 202 serving as the first actuator command signal generation unit is arranged on the downstream side of the low-pass filter 301, but the assist calculation unit 202 serving as the first actuator command signal generation unit may be arranged on the upstream side of the low-pass filter 301.

Further, description has been given of the example in which the phase compensation calculation unit 203 is arranged on the downstream side of the high-pass filter 302, but the phase compensation calculation unit 203 may be arranged on the upstream side of the high-pass filter 302.

Description is now given of technical ideas that may be understood from the above-mentioned embodiments.

In one aspect, there is provided a control device for a power steering device. The power steering device includes: a steering mechanism configured to steer steered wheels in accordance with a steering operation of a driver; a torque sensor, which is provided in the steering mechanism, and is configured to detect a steering torque; and an electric actuator configured to apply a steering force to the steering mechanism. The control device includes a controller, and the controller includes a steering torque signal reception unit, a first actuator command signal generation unit, a low-pass filter unit, a phase compensation signal generation unit, a high-pass filter unit, and a second actuator command signal output unit. The steering torque signal reception unit is configured to receive a steering torque signal, which is an output signal of the torque sensor. The first actuator command signal generation unit is configured to generate a first actuator command signal based on the steering torque signal. The low-pass filter unit includes a cutoff frequency adjustment unit, and the low-pass filter unit is configured to attenuate a component, which is a component of a low-pass-filter input signal input to the low-pass filter unit, and has a frequency equal to or higher than a cutoff frequency set by the cutoff frequency adjustment unit, the low-pass-filter input signal being the steering torque signal or the first actuator command signal passing through the low-pass filter unit. The cutoff frequency adjustment unit is configured to adjust the cutoff frequency for partially attenuating the component of the low-pass filter input signal, set the cutoff frequency to a first cutoff frequency when the steering torque signal is lower than a first predetermined torque value, and to set the cutoff frequency to a second cutoff frequency lower than the first cutoff frequency when the steering torque signal is equal to or higher than the first predetermined torque value. The phase compensation signal generation unit is configured to generate a phase compensation signal based on the steering torque signal. The high-pass filter unit is configured to attenuate a component, which is a component of a high-pass-filter input signal input to the high-pass filter unit, and has a frequency equal to or lower than a third cutoff frequency, which is a frequency higher than the first cutoff frequency, the high-pass-filter input signal being the steering torque signal or the phase compensation signal passing through the high-pass filter unit. The second actuator command signal output unit is configured to output a second actuator command signal, which is a command signal directed to the electric actuator, based on the first actuator command signal and the phase compensation signal.

In a more preferred aspect, in the aspect described above, the steering mechanism includes a steering shaft configured to rotate as a steering wheel rotates. The steering shaft includes an input shaft, an output shaft, a torsion bar, and a rotation restriction portion, the torsion bar being provided between the input shaft and the output shaft. The rotation restriction portion is configured to restrict a relative angle between the input shaft and the output shaft, which is a torsion amount of the torsion bar, to an angle smaller than a predetermined angle. The torque sensor is configured to output the steering torque signal in accordance with a magnitude of the relative angle between the input shaft and the output shaft. The first predetermined torque value is a value lower than a value of the steering torque signal at a time when the relative angle between the input shaft and the output shaft is at the predetermined angle.

In another preferred aspect, in any one of the aspects described above, the cutoff frequency adjustment unit is configured to gradually reduce the cutoff frequency so that the cutoff frequency approaches the second cutoff frequency from the first cutoff frequency as a value of the steering torque signal increases.

In still another preferred aspect, in the aspect described above, the steering mechanism includes a steering shaft configured to rotate as a steering wheel rotates. The steering shaft includes an input shaft, an output shaft, a torsion bar, and a rotation restriction portion, the torsion bar being provided between the input shaft and the output shaft. The rotation restriction portion is configured to restrict a relative angle between the input shaft and the output shaft, which is a torsion amount of the torsion bar, to an angle smaller than a predetermined angle. The torque sensor is configured to output the steering torque signal in accordance with a magnitude of the relative angle between the input shaft and the output shaft. The first predetermined torque value is a value lower than a value of the steering torque signal at a time when the relative angle between the input shaft and the output shaft is at the predetermined angle. The cutoff frequency adjustment unit is configured to gradually reduce the cutoff frequency so that the cutoff frequency approaches the second cutoff frequency from the first cutoff frequency, and reaches the second cutoff frequency before the relative angle reaches the predetermined angle.

In still another preferred aspect, in any one of the aspects described above, the controller includes a microprocessor, and the low-pass filter unit is a digital filter provided in the microprocessor.

In another preferred aspect, in any one of the aspects described above, the steering mechanism includes a steering shaft configured to rotate as a steering wheel rotates. The steering shaft includes an input shaft, an output shaft, a torsion bar, and a rotation restriction portion, the torsion bar being provided between the input shaft and the output shaft. The rotation restriction portion is configured, to restrict a relative angle between the input shaft and the output shaft, which is a torsion amount of the torsion bar, to an angle smaller than a predetermined angle. The controller includes a steering angle signal reception unit, and the steering angle signal reception unit is configured to receive a steering angle signal, which is a signal relating to steering angles of the steered wheels. The cutoff frequency adjustment unit is configured to adjust the cutoff frequency so that, when the steering angle signal is equal to or larger than a predetermined value and a value of the steering torque signal is increasing, the cutoff frequency is lower than the first cutoff frequency.

In another preferred aspect, in any one of the aspects described above, the controller includes a vehicle speed signal reception unit configured to receive a vehicle speed signal, and the cutoff frequency adjustment unit is configured to inhibit the cutoff frequency from being changed to the second cutoff frequency when the vehicle speed signal is equal to or higher than a predetermined vehicle speed.

In another preferred aspect, in any one of the aspects described above, the cutoff frequency adjustment unit is configured to set the cutoff frequency to the second cutoff frequency when the steering torque signal increases from a value lower than the first predetermined torque value to reach the first predetermined torque value, and the cutoff frequency adjustment unit is configured to set the cutoff frequency to the first cutoff frequency when the steering torque value decreases from a value higher than the first predetermined torque value to reach a second predetermined torque lower than the first predetermined torque value.

In another preferred aspect, in any one of the aspects described above, the controller includes a second actuator command signal output limit unit, and the second actuator command signal output limit unit is configured to execute second actuator command signal output limiting control of reducing an upper limit value of the second actuator command signal or reducing output of the second actuator command signal. The cutoff frequency adjustment unit is configured to set the cutoff frequency to the second cutoff frequency when the second actuator command signal output limiting control is executed by the second actuator command signal output limit unit.

In another preferred aspect, in any one of the aspects described above, the steering torque signal is input to the low-pass filter unit, and an output signal of the low-pass filter unit is input to the first actuator command signal generation unit.

The present invention is not limited to the embodiments described above, and encompasses various modification examples. For example, the embodiments have described the present invention in detail for the ease of understanding, and the present invention is not necessarily limited to a mode that includes all of the configurations described above. A part of the configuration of one embodiment may be replaced with the configuration of another embodiment, and the configuration of one embodiment may be used in combination with the configuration of another embodiment. In each embodiment, another configuration may be added to, deleted from, or replace a part of the configuration of the embodiment.

The present application claims a priority based on Japanese Patent Application No. 2018-052079 filed on Mar. 20, 2018. All disclosed contents including Specification, Scope of Claims, Drawings, and Abstract of Japanese Patent Application No. 2018-052079 filed on Mar. 20, 2018 are incorporated herein by reference in their entirety.

REFERENCE SIGNS LIST

1 steering wheel, 2 steering shaft (input shaft), 2b pinion shaft (output shaft), 3 rack-and-pinion mechanism (steering mechanism), 5 power steering mechanism, 5a electric motor (electric actuator), 10 steering angle sensor, 11 torque sensor, 12 vehicle speed sensor, 13 motor rotation angle sensor, 20 controller, 20a steering torque signal reception unit, 20b steering angle signal reception unit, 20c vehicle speed signal reception unit, 100 power steering device, 201 torque calculation unit, 202 assist calculation unit (first actuator command signal generation unit), 203 phase compensation calculation unit, 209 addition unit (second actuator command signal generation unit), 301 low-pass filter unit, 301a cutoff frequency adjustment unit, 302 high-pass filter unit, 400 second actuator command signal limit unit, F1 first cutoff frequency, F2 second cutoff frequency, T steering torque signal (output signal of torque sensor), T1 first predetermined torque value, T1a gradual-change-start first predetermined torque value, T1b gradual-change-end first predetermined torque value (first predetermined torque value), T2 second predetermined torque value, T2a gradual-change-start second predetermined torque value (second predetermined torque value), T2b gradual-change-end second predetermined torque value, Tas assist torque signal (first actuator command signal), Tf assist torque signal (second actuator command signal), Ts steering torque signal (output signal of torque calculation unit), Ts1 steering torque signal (output signal of low-pass filter unit), Sa control limit command signal (output signal of second actuator command signal limit unit), VSP vehicle speed signal (output signal of vehicle speed sensor), θ steering angle signal (output signal of steering angle signal reception unit), θs steering angle signal (output signal of steering angle calculation unit)

The invention claimed is:

1. A control device for a power steering device, the power steering device including: a steering mechanism configured to steer steered wheels in accordance with a steering operation of a driver; a torque sensor, which is provided in the steering mechanism, and is configured to detect a steering torque; and an electric actuator configured to apply a steering force to the steering mechanism, the control device comprising a controller, wherein the controller includes a steering torque signal reception unit, a first actuator command signal generation unit, a low-pass filter unit, a phase compensation signal generation unit, a high-pass filter unit, and a second actuator command signal output unit, wherein the steering torque signal reception unit is configured to receive a steering torque signal, which is an output signal of the torque sensor, wherein the first actuator command signal generation unit is configured to generate a first actuator command signal based on the steering torque signal, wherein the low-pass filter unit includes a cutoff frequency adjustment unit, wherein the low-pass filter unit is configured to attenuate a component, which is a component of a low-pass-filter input signal input to the low-pass filter unit, and has a frequency equal to or higher than a cutoff frequency set by the cutoff frequency adjustment unit, the low-pass-filter input signal being the steering torque signal or the first actuator command signal passing through the low-pass filter unit, wherein the cutoff frequency adjustment unit is configured to adjust the cutoff frequency for partially attenuating the component of the low-pass filter input signal, set the cutoff frequency to a first cutoff frequency when the steering torque signal is lower than a first predetermined torque value, and to set the cutoff frequency to a second cutoff frequency lower than the first cutoff frequency when the steering torque signal is equal to or higher than the first predetermined torque value, wherein the phase compensation signal generation unit is configured to generate a phase compensation signal based on the steering torque signal, wherein the high-pass filter unit is configured to attenuate a component, which is a component of a high-pass-filter input signal input to the high-pass filter unit, and has a frequency equal to or lower than a third cutoff frequency, the third cutoff frequency being a frequency higher than the first cutoff frequency, the high-pass-filter input signal being the steering torque signal or the phase compensation signal passing through the high-pass filter unit, and wherein the second actuator command signal output unit is configured to output a second actuator command signal, which is a command signal directed to the electric actuator, based on the first actuator command signal and the phase compensation signal.

2. The control device for a power steering device according to claim 1, wherein the steering mechanism includes a steering shaft configured to rotate as a steering wheel rotates, wherein the steering shaft includes an input shaft, an output shaft, a torsion bar, and a rotation restriction portion, the torsion bar being provided between the input shaft and the output shaft, wherein the rotation restriction portion is configured to restrict a relative angle between the input shaft and the output shaft, which is a torsion amount of the torsion bar, to an angle smaller than a predetermined angle, wherein the torque sensor is configured to output the steering torque signal in accordance with a magnitude of the relative angle between the input shaft and the output shaft, and wherein the first predetermined torque value is a value lower than a value of the steering torque signal at a time when the relative angle between the input shaft and the output shaft is at the predetermined angle.

3. The control device for a power steering device according to claim 1, wherein the cutoff frequency adjustment unit is configured to gradually reduce the cutoff frequency so that the cutoff frequency approaches the second cutoff frequency from the first cutoff frequency as a value of the steering torque signal increases.

4. The control device for a power steering device according to claim 3, wherein the steering mechanism includes a steering shaft configured to rotate as a steering wheel rotates, wherein the steering shaft includes an input shaft, an output shaft, a torsion bar, and a rotation restriction portion, the torsion bar being provided between the input shaft and the output shaft, wherein the rotation restriction portion is configured to restrict a relative angle between the input shaft and the output shaft, which is a torsion amount of the torsion bar, to an angle smaller than a predetermined angle, wherein the torque sensor is configured to output the steering torque signal in accordance with a magnitude of the relative angle between the input shaft and the output shaft, wherein the first predetermined torque value is a value lower than a value of the steering torque signal at a time when the relative angle between the input shaft and the output shaft is at the predetermined angle, and wherein the cutoff frequency adjustment unit is configured to gradually reduce the cutoff frequency so that the cutoff frequency approaches the second cutoff frequency from the first cutoff frequency, and reaches the second cutoff frequency before the relative angle reaches the predetermined angle.

5. The control device for a power steering device according to claim 1, wherein the controller includes a microprocessor, and wherein the low-pass filter unit is a digital filter provided in the microprocessor.

6. The control device for a power steering device according to claim 1, wherein the steering mechanism includes a steering shaft configured to rotate as a steering wheel rotates, wherein the steering shaft includes an input shaft, an output shaft, a torsion bar, and a rotation restriction portion, the torsion bar being provided between the input shaft and the output shaft, wherein the rotation restriction portion is configured to restrict a relative angle between the input shaft and the output shaft, which is a torsion amount of the torsion bar, to an angle smaller than a predetermined angle, wherein the controller includes a steering angle signal reception unit, wherein the steering angle signal reception unit is configured to receive a steering angle signal, which is a signal relating to steering angles of the steered wheels, and wherein the cutoff frequency adjustment unit is configured to adjust the cutoff frequency so that, when the steering angle signal is equal to or larger than a predetermined value and a value of the steering torque signal is increasing, the cutoff frequency is lower than the first cutoff frequency.

7. The control device for a power steering device according to claim 1, wherein the controller includes a vehicle speed signal reception unit configured to receive a vehicle speed signal, and wherein the cutoff frequency adjustment unit is configured to inhibit the cutoff frequency from being changed to the second cutoff frequency when the vehicle speed signal is equal to or higher than a predetermined vehicle speed.

8. The control device for a power steering device according to claim 1, wherein the cutoff frequency adjustment unit is configured to set the cutoff frequency to the second cutoff frequency when the steering torque signal increases from a value lower than the first predetermined torque value to reach the first predetermined torque value, and wherein the cutoff frequency adjustment unit is configured to set the cutoff frequency to the first cutoff frequency when the steering, torque value decreases from a value higher than the first predetermined torque value to reach a second predetermined torque lower than the first predetermined torque value.

9. The control device for a power steering, device according to claim 1, wherein the controller includes a second actuator command signal output limit unit, wherein the second actuator command signal output limit unit is configured to execute second actuator command signal output limiting control of reducing an upper limit value of the second actuator command signal or reducing output of the second actuator command signal, and wherein the cutoff frequency adjustment unit is configured to set the cutoff frequency to the second cutoff frequency when the second actuator command signal output limiting control is executed by the second actuator command signal output limit unit.

10. The control device for a power steering device according to claim 1, wherein the steering torque signal is input to the low-pass filter unit, and wherein an output signal of the low-pass filter unit is input to the first actuator command signal generation unit.

* * * * *